United States Patent [19]

McEvoy

[11] Patent Number: 4,585,710
[45] Date of Patent: Apr. 29, 1986

[54] ZINC/AIR CELL CATHODE

[75] Inventor: John J. McEvoy, Eagan, Minn.

[73] Assignee: Duracell Inc., Bethel, Conn.

[21] Appl. No.: 726,443

[22] Filed: Apr. 22, 1985

[51] Int. Cl.$^4$ .................................. H01M 12/06
[52] U.S. Cl. .................................. 429/27; 427/42
[58] Field of Search .................. 429/27, 29, 42, 40, 429/44, 229, 206, 249; 252/182.1

[56]  References Cited

U.S. PATENT DOCUMENTS

| 3,793,085 | 2/1974 | Hino et al. | 429/42 |
| 3,855,000 | 12/1974 | Jammet | 429/27 |
| 4,121,018 | 10/1978 | Kocherginsky et al. | 429/27 |
| 4,189,526 | 2/1980 | Cretzmeyer et al. | 429/27 X |
| 4,333,993 | 6/1982 | Gibbard | 429/42 X |

*Primary Examiner*—Anthony Skapars
*Attorney, Agent, or Firm*—Ronald S. Cornell; Israel Nissenbaum

[57]  ABSTRACT

A cathode for an air depolarized cell in which the hydrophobic catalytic cathode contains or is integrally coated with, on the surface adjacent the cell separator, an absorbent material such as the gelling material used in the anode. The absorbent material, integrated with the cathode surface, adheres the separator to the cathode thereby preventing delamination and provides an electrolyte reservoir for the hydrophobic cathode.

17 Claims, No Drawings

ZINC/AIR CELL CATHODE

This invention relates to cathodes for air depolarized cells particularly such cells having a zinc anode and having a diameter in excess of 0.5 inches (1.27 cm).

Cathodes of air depolarized cells are catalytic in nature and generally remain unaffected by cell discharge in terms of chemical composition and volume change. In addition such cathodes are usually also hydrophobic because of the hydrophobic binders such as polytetrafluoroethylene (PTFE) commonly utilized. This hydrophobic characteristic of the cathode is important in order to help prevent saturation or flooding of the cathode with electrolyte since such flooding would effectively reduce the amount of air reaching the cathode for electrochemical depolarization. A careful balance of electrolyte wetting of the cathode is therefore required for proper operation of air depolarized cells. However, the aforementioned catalytic and hydrophobic characteristics of the cathodes in such cells result in problems unique to air depolarized cell systems relating to such electrolyte wetting.

Air depolarized cell cathodes are generally comprised of a conductive material such as carbon held together with a hydrophobic binder and impregnated with a catalyst which catalyzes air (oxygen) reduction. The cathode mix is placed on a substrate such as a metal grid for structural support.

A common cathode for air depolarized cells such as used in commercially available zinc/air cells, is comprised of a PTFE bonded porous conductive carbon substrate catalyzed with a small amount of manganese dioxide and embedded in a nickel screen current collector. One side of the cathode (facing the incoming air) is laminated with a film layer of unsintered PTFE which functions as a hydrophobic barrier to minimize electrolyte leakage from the cell while permitting ingress of the depolarizing air. A separator such as of microporous polypropylene is placed on the other side of the cathode as a physical barrier between anode and cathode. Since the cell has a continuously renewable source of cathode depolarizer (air) the cell is constructed with a substantial amount of anode material most commonly a powdered metal such as zinc and a void volume (on the order of 20%) in order to accommodate anode expansion with discharge material. In other types of cells, such as alkaline $Zn/MnO_2$ cell, having active rather than catalytic cathodes, the anode and cathode generally complement each other in expansion and contraction whereby a similar void volume to accommodate anode expansion is unnecessary. Another unique feature of metal/air cells results from the fact that the cathode is hydrophobic and will not hold electrolyte. It is therefore essential that the separator with which it is in contact provides the requisite electrolyte contact. It has however been discovered that in metal/air cells such as zinc/air cells, particularly in cell sizes with diameters in excess of 0.5 inches (1.27 cm), there is a large internal impedance increase during cell storage. Such increase in impedance has been discovered to be the result of delamination of the separator from the cathode because of anode shifting allowed by the void space. Once the separator is delaminated from a portion of the cathode such portion becomes electrolyte starved (the cathode having little or no retained electrolyte) and inactive with resultant increase in cell impedance. This problem is exacerbated when the cells are subjected to vibration such as during transit even if they are packaged in air tight containers. Furthermore, should the cells not be stored in air tight containers, there is a problem of "drying out" of the cell with the cathode losing its electrolyte first because of its hydrophobic nature and its position adjacent the inlet for air which also becomes an outlet for moisture. The unsintered PTFE hydrophobic barrier generally retards rather than totally prevents such moisture loss. Since anodes tend to be made with absorbent materials (gelling materials used to homogeneously suspend and maintain anode metal powders in position) the remaining electrolyte is absorbed into the anode while the cathode becomes electrolyte starved creating an electrolyte imbalance which results in premature cell deactivation. Such imbalance is more acute in cells which have been subject to "drying out" since there is an electrolyte deficiency.

It is an object of the present invention to provide a means whereby separator delamination from the cathode is reduced or eliminated and whereby cell impedance is concomitantly prevented from becoming excessively high.

It is a further object of the present invention to provide a means for minimizing the effects of cell "drying out" on hydrophobic cathodes.

It is a still further object of the present invention to provide means for correction of cell electrolyte imbalance in cells having such hydrophobic cathodes.

These and other objects features and advantages of the present invention will become more evident from the following discussion.

Generally the present invention comprises the integration of an absorbent material with the cathode surface adjacent the separator. Such absorbent material must have an adhesive property whereby it substantially binds the separator to the cathode to prevent delamination. In addition it must be electrolyte absorbent whereby it does not in itself impede electrolyte contact between separator and cathode and in fact becomes a non-intrusive electrolyte reservoir for the cathode. The use of a more absorbent separator does not solve the delamination problem and the use of an adhesive between such more absorbent separator and the cathode to prevent delamination results in higher cell impedance caused by the adhesive itself. Though U.S. Pat. No. 3,746,580 discloses the placement of a gelatinous thixotropic material in a framed area above a cathode surface as a separator itself or in conjunction with an additional separator there is no adhesion thereby between such other separator and the cathode surface. The gelatinous material is merely placed on the cathode surface and is not integrated thereto as required in the present invention. As a result there is no retardation of delamination by such gelatinous material. Furthermore, such patent describes the utilization of a separator in addition to the gelatinous material only if the anode is not a zinc gel. In the present invention it is the utilization of an anode gel itself which exacerbates cell impedance problems (because of anode absorption of the electrolyte) with the adherent absorbent material being specifically utilized in conjunction with an existing separator to solve such problem.

It is preferred that the absorbent material of the present invention, having adhesive properties, be integrated with the cathode surface and be positioned between cathode and separator. However, to a lesser extent but still utilizable is the integration of the absorbent material directly with the cathode, such as by admixture with the cathode components, since a sufficient amount of the absorbent material is on the surface of the cathode adjacent the separator to effect the requisite adhesion. Ideal materials for use as the absorbent material of the present invention are gelling materials utilized in electrochemical cell anodes for maintainance of homogeniety thereof. (Cathodes, particularly those in air depolarized cells having structural integrity, have however had no real reason for the inclusion of a gelling agent therein in contrast to powdered anodes.) In particular the belling material utilized between the cathode and the separator should most preferably be the same as that used in the anode. If not, such gelling material should have substantially the same moisture absorbent characteristics as the gelling material used in the anode in order to help balance electrolyte distribution in the cell.

It is preferred that the gelling material be substantially insoluble in the cell electrolyte whereby it does not migrate from a position between the cathode and the separator. Accordingly gelling materials such as carboxymethyl cellulose (CMC) which are soluble to some extent in alkaline electrolyte solutions are less preferred while starch graft copolymers such as Water-Lock A 221 from Grain Processing Corp., Xanthan gum, cross-linked polyacrylamides, cross-linked CMC, cross-linked polyacrylic acid such as Carbopol from B. F. Goodrich Co., alkali saponified polyacrylonitrile such as Water Lock A 400 from Grain Processing Corp. and polyacrylic acids such as the sodium salts Water Lock J 500 and J 550 from Grain Processing Corp. etc. which are less soluble or insoluble in such electrolytes are more preferred.

Absorbency of such materials is measured in various media such as deionized water and saline solutions as usually described in product literature. For example, layers of air laid paper and tissue laminated with Water Lock J 500 and J 550 (3 gm/ft$^2$) are described in product literature as having absorbencies in distilled water and 1% saline solution of 1,600 & 300 and 1,400 & 260 gm/ft$^2$ respectively. However, in accordance with the present invention such absorbencies are measured for the alkaline electrolyte solutions into which such materials are placed, with such absorbencies, in alkaline solutions, being lower than for the saline solutions.

The amount of absorbent material such as gelling material utilized is dependent upon its fluid absorbency rate and the manner of utilization, i.e. whether admixed with the cathode or integrated with the surface thereof. Since the cathode in an air depolarized cell is a catalytic rather than an active one, large amounts of the gelling material may be added to the cathode without reduction of cell capacity. However, massive inclusions should be limited for other considerations (aside from economic ones). The cathode should not be formed into a jelly-like material whereby it loses its structural integrity and excess amounts of absorbent material in the cathode would tend to hold greater amounts of electrolyte with possible resultant detrimental flooding of the air depolarized cathode.

The minimal amount of gelling material, when integrated with the cathode surface, should be sufficient to form a continuous coating on the surface of the cathode adjacent the separator whereby the separator is adhered to the cathode therewith. A preferred amount is one sufficient to retain sufficient electrolyte whereby it functions as an electrolyte reservoir for the cathode without flooding it. Additional amounts of gelling material between cathode and separator would, aside from retaining too much electrolyte in such position, minimize the amount of volume available for the active anode material without concomitant benefit.

The present invention is of particular utility in button type cells having diameters in excess of 0.5 inches (1.27 cm) since separators which span such diameter are more likely to become delaminated from a cathode surface. However, in cells of other configurations and dimensions the absorbent material serves the additional important purpose of functioning as an electrolyte reservoir for the hydrophobic cathode whereby the effects of cell "drying out" can be minimized thereby.

Separator materials used in metal/air cell include the aforementioned microporous polypropylene as well as other separator materials including microporous polyethylene, polyvinychloride (PVC), cellophane, acrylonitrile and the like.

Various methods are useful in integrating the gelling material with the cathode surface such as by placing the gelling material (usually in powder form) onto a finished cathode sheet prior to laminating with the separator and compressing the gelling material into the cathode surface by calendaring. Another method is by direct addition of the gelling material to the cathode mixture generally in amounts ranging between 2% to 20% by weight of the cathode. The most preferred method which provides the most efficacious results comprises dispensing the gelling material onto a working surface such as a steel belt and thereafter dispensing the carbon containing cathode material thereon. Both materials are then compressed into a screen to form the cathode which is then laminated with the separator to the gelling material side of the cathode.

In order to more clearly illustrate the efficacy of the present invention the following comparative examples are presented. It is understood however that such examples are for illustrative purposes only and the present invention is not to be construed as being limited to the specifics contained therein. Unless otherwise indicated all parts are parts by weight.

EXAMPLE 1

Identical button type Zn/Air cells are each made with 0.610 inch (1.55 cm) diameters and 0.238 inch (0.60 cm) heights with 1.34 grams of a 3% mercury amalgamated zinc anode containing Waterlock J-550 (from Grain Processing Corp.) as a gelling material. The anode height is 0.197" (0.5 cm) and the void height is 0.035" (0.089 cm). The cathode is made of PTFE bonded carbon catalyzed with manganese dioxide and embedded on a nickel screen current collector. A microporous polypropylene film separator is laminated to the cathode surface facing the anode and an unsintered PTFE film is laminated to the other surface of the cathode as the air permeable hydrophobic electrolyte barrier. The cells each contain 410 mgs of a 30% KOH solution as electrolyte. One group of 32 cells (GROUP I) is made with cathodes which are made by sprinkling Waterlock J-550 onto a steel belt, dispensing the cathode mix of carbon, PTFE and $MnO_2$ thereon and compressing the nickel screen into the cathode. The Waterlock J-550 and cathode surface are integrated with such compression. The second group of 32 cells (GROUP II) are made without such sprinkling and are representative of prior art cell construction. The cells are tested by oven heating at 150° F. (66° C.) at ambient room humidity (R.H.) for one month. The cells are removed from the oven during the month and are tested for impedance, limiting current and capacity (all the cells are discharged through a 50 ohm resistor to a 1.1 volt cutoff) with the results (as averaged out) given in Table I:

TABLE I

| | Group I (PRIOR ART) | | GROUP II (J~550 SPRINKLED) | |
|---|---|---|---|---|
| Days | LIMITING CURRENT (mA) | CAPACITY (mAhr) | LIMITING CURRENT (mA) | CAPACITY (mAhr) |
| 3 | 31,629 | 937 | 32,139 | 930 |
| 7 | 31,416 | 943 | 32,979 | 961 |
| 14 | 31,050 | 948 | 32,816 | 950 |
| 21 | 30,829 | 927 | 32,646 | 966 |
| 28 | 29,909 | 938 | 31,665 | 920 |

It is evident from the above data that the limiting current for the cells of the present invention is consistently higher than that of the prior art cells and that the capacity of the cells of the present invention is about the same as that of the prior art cells. Expected cathode flooding with the use of the J-550 absorbent material was not evident since there was no decline in cell performance.

EXAMPLE 2

Additional cells (thirty two in each group) are made as in Example 1 with such cells being tested with a zero percent relative humidity test simulating a worst condition i.e. cell drying. The cells are weighed and stored in a desiccator for a one month period of time and removed during such period and weighed to determine percentage of water loss and discharge tested under the same conditions as in Example 1. Water loss of cells desiccated for the same time period are substantially the same (within 4 mg of each other). The averaged results are set forth in Table II:

TABLE II

| | | GROUP I (PRIOR ART) | | GROUP II (J-550 SPRINKLED) | |
|---|---|---|---|---|---|
| DAYS | % H$_2$O LOSS | LIMITING CURRENT (mA) | CAPACITY (mAhr) | LIMITING CURRENT (mA) | CAPACITY (mAhr) |
| 2 | 6% | 27.486 | 933 | 28.331 | 911 |
| 8 | 20% | 8.253 | 103 | 30.689 | 890 |
| 11 | 22% | 9.391 | 108 | 25.813 | 855 |
| 15 | 35% | 4.239 | 0 | 22.484 | 588 |
| 22 | 39% | 5.933 | 0 | 18.166 | 488 |

Both the limiting current and capacity are substantially higher for the cells of the present invention as compared to prior art cells despite the loss of substantially equal amounts of water.

EXAMPLE 3

Cells made as in Example 1 (eight in each group) are vibrated for ten minutes to simulate shipping conditions. The cells are then stored and checked for impedance with the averaged results given in Table III:

TABLE III

| | GROUP I (PRIOR ART) | GROUP II (J-550 SPRINKLED) |
|---|---|---|
| DAYS | IMPEDANCE (OHMS) | IMPEDANCE (OHMS) |
| 7 | 6,924 | 4,586 |
| 27 | 10,868 | 5,344 |
| 40 | 10,195 | 5,564 |

The impedance values for the cells of the present invention are markedly superior without substantial degradation as compared to cells of the prior art.

It is understood that the above examples are for illustrative purposes only showing the efficacy of the cells of the present invention as compared to prior art cells. Accordingly the present invention is not limited to the specific embodiments disclosed. Changes may be made with respect to materials utilized, cell and cell component structures and placement as well as relative proportions of such materials without departing from the scope of the present invention as defined in the following claims.

What is claimed is:

1. A metal/air depolarized cell comprising a metal anode, a hydrophobic catalytic cathode and a separator therebetween and a fluid alkaline electrolyte characterized in that said separator is adheringly laminated to said cathode by means of a material capable of absorbing said electrolyte which is integrated with the surface of said cathode adjacent said separator.

2. The cell of claim 1 wherein said metal is zinc.

3. The cell of claim 1 wherein said material is a gelling material.

4. The cell of claim 3 wherein said anode is gelled with a gelling agent and said gelling material has substantially the same absorbency with respect to said fluid alkaline electrolyte as said gelling agent.

5. The cell of claim 4 wherein said gelling agent in said anode and said gelling material are the same.

6. The cell of claim 3 wherein said gelling material is selected from the group consisting of starch graft copolymers, Xanthan gum, cross-linked polyacrylamides, cross-linked CMC, cross-linked polyacrylic acid, alkali saponified polyacrylonitrile and polyacrylic acid.

7. The cell of claim 6 wherein said separator is comprised of a member of the group consisting of microporous polypropylene, microporous polyethylene, polyvinychloride (PVC), cellophane, and acrylonitrile.

8. The cell of claim 7 wherein said gelling material is homogeneously dispersed within said cathode.

9. The cell of claim 8 wherein said gelling material comprises from 2% to 20% by weight of said cathode.

10. The cell of claim 7 wherein said gelling material is integrated to said cathode surface by having been compressed thereon.

11. The cell of claim 10 wherein said cell is in a button type cell configuration with the diameter of said cell being in excess of 0.5 inches (1.27 cm).

12. A zinc/air electrochemical cell comprising a powdered zinc anode gelled with an electrolyte absorbent gelling material; a void volume to accommodate anode expansion during dischage; a catalytic hydrophobic cathode comprised of carbon, a hydrophobic PTFE binder, an MnO$_2$ catalyst and a metal substrate; an alkaline electrolyte and a separator, between said anode and cathode, comprised of a member of the group consisting of microporons polypropylene, microporous polyethylene, polyvinylchloride (PVC), cellophane, and acrylonitrile; characterized in that a gelling material of substantially the same alkaline electrolyte absorbency as the gelling material in said anode is integrated with the surface of said cathode adjacent said separator whereby said separator is adhered thereby to said cathode to substantially retard delamination between said cathode and separator resulting from movement of said anode into said void space.

13. The cell of claim 12 wherein said separator is comprised of microporous polypropylene.

14. The cell of claim 12 wherein said gelling material is homogeneously dispersed within said cathode.

15. The cell of claim 14 wherein said gelling material comprises from 2% to 20% by weight of said cathode.

16. The cell of claim 12 wherein said gelling material is integrated to said cathode surface by having been compressed thereon.

17. The cell of claim 12 wherein said cell is in a button type cell configuration with the diameter of said cell being in excess of 0.5 inches (1.27 cm).

* * * * *

UNITED STATES PATENT AND TRADEMARK OFFICE
CERTIFICATE OF CORRECTION

PATENT NO. : 4,585,710

DATED : April 29, 1986

INVENTOR(S) : John J. McEvoy

It is certified that error appears in the above-identified patent and that said Letters Patent are hereby corrected as shown below:

In Col. 3, line 11, delete "belling" and substitute ---gelling---.
In Col. 4, line 16, delete "polyvinychloride" and substitute ---polyvinylchloride---
In Col. 4, line 58, delete "I" and substitute ---II---;
        line 63, delete "II" and substitute ---I---.
In Col. 5, Tables I and III, delete all of the commas "," and substitute periods ---.---.
In Col. 6, line 50, delete "polyvinychloride" and substitute ---polyvinylchloride---.

Signed and Sealed this

Eighteenth Day of November, 1986

Attest:

DONALD J. QUIGG

Attesting Officer     Commissioner of Patents and Trademarks